United States Patent [19]

Organ et al.

[11] Patent Number: 5,281,649
[45] Date of Patent: Jan. 25, 1994

[54] HYDROXYALKANOATE POLYMER COMPOSITION

[75] Inventors: Sally J. Organ; Peter J. Barham, both of Bristol; Andrew Webb, Yarm, all of United Kingdom

[73] Assignee: Imperial Chemical Industries plc, London, England

[21] Appl. No.: 955,878

[22] PCT Filed: Jun. 7, 1991

[86] PCT No.: PCT/EP91/01071
§ 371 Date: Feb. 11, 1993
§ 102(e) Date: Feb. 11, 1993

[87] PCT Pub. No.: WO91/19759
PCT Pub. Date: Dec. 26, 1991

[30] Foreign Application Priority Data

Jun. 11, 1990 [GB] United Kingdom ............... 9012975

[51] Int. Cl.$^5$ ............... C08K 3/28; C08C 19/22
[52] U.S. Cl. ............... 524/428; 525/378
[58] Field of Search ............... 524/428; 525/378

[56] References Cited

U.S. PATENT DOCUMENTS 3,471,455 10/1969 Binsbergen ............... 524/287
4,900,299 2/1990 Webb ............... 604/11

FOREIGN PATENT DOCUMENTS 291024 11/1988 European Pat. Off. .

Primary Examiner—Paul R. Michl
Assistant Examiner—Peter Szekely
Attorney, Agent, or Firm—Cushman, Darby & Cushman

[57] ABSTRACT

$NH_4Cl$ is used as a nucleating agent to prepare polyhydroxyalkanoate compositions.

9 Claims, No Drawings

HYDROXYALKANOATE POLYMER COMPOSITION

This invention relates to a hydroxyalkanoate polymer composition and to a process for the production thereof, and in particular to a 3-hydroxybutyrate polymer composition and to a process for the production thereof.

Homopolymer of 3-hydroxybutyrate, known as poly(3-hydroxybutyrate), or PHB, is a thermoplastic polyester consisting of monomer units of the formula:

—CH(CH$_3$).CH$_2$.CO.O— which is accumulated by many microorganisms, particularly bacteria, for example of the genera Alcaligenes, Athiorhodium, Azotobacter, Bacillus, Nocardia, Pseudomonas, Rhizobium, and Spirillium, as an energy reserve material.

PHB is conveniently prepared by cultivating the microorganism in an aqueous medium on a suitable assimilable substrate, such as a carbohydrate or methanol, as an energy and carbon source. Examples of suitable processes are described in EP-A-15669 and EP-A-46344.

Other polymers containing monomer units of 3-hydroxybutyrate in combination with other monomer units, such as 3-hydroxyvalerate units, can also be produced microbiologically. Such combinations of dissimilar monomer units are termed copolymers. Thus a microbiologically produced copolymer containing 3-hydroxybutyrate and 3-hydroxyvalerate residues is described by Wallen et al in "Environmental Science and Technology", 8, (1974), 576–9. Also, as described in EP-A-52459 and EP-A-69497, various copolymers can be produced by cultivating the microorganism on certain substrates, such as propionic acid which gives rise to 3-hydroxyvalerate units in the copolymer.

Copolymers can also be made containing monomer units of other hydroxycarboxylic acids and/or units derived from diols, e.g. ethylene glycol, and/or dicarboxylic acids, e.g. isophthalic acid, by ester interchange occurring when the microbiologically produced polymer or copolymer is melted with such a hydroxycarboxylic acid, lactone thereof, e.g. pivalolactone, diol, dicarboxylic acid and/or polyester produced therefrom.

In the following description therefore, by the term HB polymer we mean not only PHB, but also copolymers as described above, provided that 3-hydroxybutyrate monomer units form at least part of the polymer chain.

While cells containing the HB polymer can be used as such as a moulding material, for example as described in U.S. Pat. No. 3,107,172, it is generally desirable to separate the HB polymer from the remainder of the cell material.

Methods that have been proposed to effect this separation include breakage of the cells by methods such as treatment with acetone, followed by extraction of the HB polymer from the broken cells by treatment with a solvent in which the HB polymer is soluble. Examples of such processes are described in U.S. Pat. No. 3,036,959 and U.S. Pat. No. 3,044,942 in which the solvents employed are pyridine or mixtures of methylene chloride and ethanol. Other extraction solvents for the HB polymer in the form in which it is produced in the cells include cyclic carbonates such as 1,2-propylene carbonate (see U.S. Pat. No. 4,101,533); chloroform (see U.S. Pat. No. 3,275,610); and 1,2-dichloroethane (as disclosed in EP-A-15123).

U.S. Pat. No. 3,275,610 discloses other methods of cell breakage, viz. ultrasonic vibration, grinding, French pressing, freezing/thawing cycles and lysozyme treatment, while as described in EP-A-15123, spray or flash drying of the suspension of cells as produced by culturing the microorganism can also cause sufficient cell breakage to enable the HB polymer to be extracted from the cells.

HB polymer can be made into shaped objects using known shaping techniques under conditions such that crystallisation of the polymers usually takes place. Such shaping techniques include processes in which HB polymer is thermally treated, e.g. injection moulding.

A particularly important factor in HB polymer processing is the crystallisation rate. The rate of crystallisation of HB polymer is generally slow, and is controlled to a major extend by the growth rate of individual crystals, and the nucleation density, both of which tend to be low. In copolymers containing hydroxyvalerate monomer units (HV copolymers), the crystallisation rate is dependent upon the proportion of hydroxyvalerate monomer units within the copolymer, and falls as this proportion increases.

The resultant low rate of nucleation in HB polymer leads to the development of large spherulites within the HB polymer. The presence in HB polymer of spherulites which are too large can significantly reduce the physical and mechanical properties of the polymers.

Furthermore the low rate of crystallisation leads to thermal treatment processes with long cycle times, thereby reducing the capacity of such processes.

The overall rate of crystallisation may be increased by the use of nucleating agents, which act by increasing the number of nuclei within the HB polymer. The increased number of nuclei leads to smaller diameter spherulites, and reduced cycle times in thermal treatment processes.

In GB 1139528 it is disclosed that spherulite size reduction during the production of polyesters from polymerised lactones can be achieved by crystallising the polyesters in the presence of certain nucleating compounds. The nucleating compounds whose use is described in GB 1139528 are (a) alkali metal chlorides, bromides and iodides and boron nitride; and (b) salts of mono-, and di-, and trivalent metals with aromatic carboxylic, sulphonic and phosphinic acids.

GB 1465046 discloses a method of producing a polyamide composition in which are blended an organophosphorus compound and a metal compound. The separate compounds may be present during polymerisation of the polyamide. The two compounds may thus be added to separate batches of polyamide during polymerisation thereof and the two batches may then be melt blended to give the overall polyamide composition.

HB polymers and polyamides both yield structures which are typical of condensation polymers. Notwithstanding this, HB polymers differ substantially from polyamides in terms of their specific chemical structure; intermolecular forces; physical properties (melting points, crystallinities, thermal stabilities); mechanical properties; solvencies; and water resistances. Furthermore, the fermentation process used in the production of HB polymers is distinguished from the production methods for polyamides. Thus, a nucleating agent cannot be added, with effect, during the fermentation process used for HB polymers.

Materials proposed to date to nucleate HB polymer include saccharin (o-sulfobenzoic acid imide), and particulates such as talc, micronised mica, boron nitride and calcium carbonate. These particulates have proved effective in increasing the nucleation density, thereby increasing the overall rate of crystallisation.

The particulates used to date have, however, a number of disadvantages.

Because the particulate has to be mixed with the HB polymer after the fermentation and extraction process, good dispersion of the particulate is often difficult. This often leads to agglomeration and inhomogeneity in moulding.

The presence of an agglomeration of particulates may then give rise to a region of stress concentration, impairing the mechanical and barrier properties.

Furthermore, it has been found that the aforementioned particulates can impart an undesirable opacity to PHB when injection moulded, or formed into films.

We have found however that ammonium chloride is a good nucleating agent. It can be incorporated with the HA polymer as aqueous solutions, thereby achieving improved dispersion. It does not normally render films opaque and tends to enhance the biodegradability of hydroxyalkanoate (HA) polymers.

According to the present invention we provide an HA polymer composition which comprises HA polymer and ammonium chloride, which is preferably in its face centered cubic form. This has a lattice parameter of 6.53 Å which matches the c-axis spacing of HB polymer.

Further according to the present invention we provide a process for the production of an HA polymer composition which comprises intimately blending together an HA polymer and ammonium chloride.

Suitable HA polymers contain at least some HA monomer units which may be represented by the structure $$-CHR^1.(CH_2)_n.CO.O-$$

wherein $R^1$ is hydrogen or an alkyl group, and preferably an $C_{1-12}$ alkyl group, especially a methyl or ethyl group, and n is a positive integer in the range 1 to 8 inclusive, preferably 1 to 5 inclusive, and especially 1 to 3 inclusive.

Thus, HA polymers also include, in addition to homopolymers, copolymers containing dissimilar HA monomer units, and/or other copolymer monomer units as described above for HB polymers.

Preferred HA polymers include the aforementioned HB copolymers, and also polymers containing monomer units wherein the group $R^1$ has the structure $$-(CH_2)_x.CH_3$$

and x is a positive integer between 1 and 6 inclusive, and wherein n is 1.

The amount of ammonium chloride to be used depends on the HA polymer to be nucleated. Typically between 0.5 and 10%, and preferably between 1 and 5% may be used.

In the process of the invention the components of the HA polymer composition may be blended together in any suitable manner. For instance they may simply be intimately mixed together at room temperature. The resultant composition is thereafter subjected to further heat treatment, e.g. by extrusion. Alternatively, an aqueous solution of the ammonium chloride may be added to the HA polymer, and thereafter the resultant composition may be dried prior to further heat treatment.

The HA polymer composition of the invention may include homopolymers such as PHB and also copolymers containing HA monomer units in combination with a wide range of proportions of other monomer units. The ammonium chloride is particularly beneficial where the HA polymer is a copolymer comprising up to 50 mol % of monomer units of 3-hydroxyvalerate, and especially where the 3-hydroxyvalerate monomer units are in combination with monomer units of 3-hydroxybutyrate.

This invention is further illustrated and described by reference to the following Examples.

In the experiments hereinafter described, differential scanning calorimetry (DSC) has been used to assess the efficiency of the nucleants. DSC is an analytical technique which allows the precise measurement of enthalpy changes during an endothermal or exothermal event. Thus, it is a useful technique to study the melting and crystallisation behaviour of crystalline materials. If molten polymer is cooled at a constant rate, an exotherm may be produced as the polymer crystallises. The temperature range over which the crystallisation occurs, the area of the peak and the peak sharpness give an indication of the crystallisation behaviour of the material. The addition of a nucleating agent generally causes an increase in the crystallisation peak temperature and the peak area.

The following results were obtained on a Perkin Elmer DSC 4 apparatus. Heat-cool DSC was used to heat approximately 7 mg samples from 20° C. to 200° C. at a constant rate of 20° C. min$^{-1}$, hold the samples isothermally at 200° C. for 2 minutes and then cool the samples at $-20°$ C. min$^{-1}$ to 20° C.

EXPERIMENT 1

PHB—Control Examples

Samples of PHB were prepared either without the addition of nucleating agent, or with the addition of 1 part of nucleating agent per hundred parts of polymer (phr), boron nitride was used as the nucleating agent in this case. The samples were tested using DSC as described above.

PHB—Examples

Samples of PHB containing varying percentages of ammonium chloride, added by stirring the polymer with appropriate quantities of a 100 g per liter solution of $NH_4Cl$ in water with subsequent evaporation, and drying for approximately 16 hours at 60° C., were prepared and tested using DSC.

The results of the above Experiment 1 for PHB were as follows:

| | Peak $T_c$ (°C.) | Area (J · g$^{-1}$) |
|---|---|---|
| PHB (No Additives) | 87.9 | 64.0 |
| PHB + 1 phr boron nitride | 109.6 | 78.4 |
| PHB + 0.005% NH$_4$Cl | 84.0 | 63.2 |
| PHB + 0.05% NH$_4$Cl | 78.9 | 62.6 |
| PHB + 0.5% NH$_4$Cl | 101.0 | 72.2 |
| PHB + 1.0% NH$_4$Cl | 102.5 | 70.1 |

| | Peak $T_c$ (°C) | Area (J · g$^{-1}$) |
|---|---|---|
| PHB + 2.0% NH$_4$Cl | 104.8 | 71.6 |
| PHB + 5.0 NH$_4$Cl | 105.7 | 71.7 |

Thus, Samples containing 0.5% or more of ammonium chloride showed significant nucleation as judged by their large peak areas and the high temperatures at which the peaks occurred.

HB/HV Copolymers

The above control examples, and examples were repeated using an HV copolymer comprising 18.4% HV. Melt flow index tests were performed at 190° C. on the samples. Samples of the extrudates from the melt flow index tests collected between 6 and 7 minutes after the start of the test were then used for DSC evaluations in order to ensure that they had a comparable thermal history with the following results:

| | Peak $T_c$ (°C) | Area (J · g$^{-1}$) |
|---|---|---|
| HB/HV (No Additives) | No recrystallisation | |
| HB/HV + 1 phr boron nitride | 52.1 | 4.0 |
| HB/HV + 0.005% NH$_4$Cl | No recrystallisation | |
| HB/HV + 0.05% NH$_4$Cl | No recrystallisation | |
| HB/HV + 0.5% NH$_4$Cl | 46.1 | 0.93 |
| HB/HV + 1.0% NH$_4$Cl | 52.5 | 1.62 |
| HB/HV + 2.0% NH$_4$Cl | 52.6 | 4.79 |
| HB/HV + 5.0 NH$_4$Cl | 60.6 | 4.17 |

Thus, samples containing 0.5% or more ammonium chloride underwent recrystallisation, and more recrystallisation was obtained with higher concentrations.

EXPERIMENT 2

In this Experiment the mechanical properties of injection moulded test pieces formed from materials containing different nucleants were evaluated.

The test pieces were prepared by melt extruding the materials using a Betol 2520 extruder to form a lace. The laces were then cut into granules for subsequent injection moulding into tensile and impact test bars. The test bars were then left for four weeks at room temperature before the mechanical properties were determined.

The tensile properties of the test pieces were determined at 20° C., using an Instron 1122 machine with a gauge length of 40 mm, and a crosshead speed of 20 mm.min$^{-1}$.

The Izod impact strength of the test pieces was determined using a Zwick pendulum impact tester on samples with 1 mm radius notches.

PHB—Control Example

PHB containing 1 phr boron nitride was prepared by tumble mixing the constituents. The resulting powder was melt extruded and processed as described above.

PHB—Example

PHB containing 1 phr ammonium chloride was prepared by adding a 10% w/v aqueous solution of ammonium chloride to PHB powder and mixing in a Hobart mixer for 10 minutes. After mixing, the water was evaporated by drying the PHB/ammonium chloride mixture to about 60° C. for 18 hours. The resulting powder was tumble mixed and melt extruded and processed as described above.

HB/HV Copolymer—Control Example

The PHB Control Example was repeated except that a 10% HV copolymer was used.

HB/HV Copolymer—Example

The PHB Example was repeated except that a 10% HV copolymer was used.

The results of Experiment 2 were as follows:

| | Youngs Modulus (GPa) | Stress at Break (MPa) | Extension at Break (%) | Area at Break (J) | (1 mm) Notched Impact (J · m$^{-1}$) |
|---|---|---|---|---|---|
| PHB + 1 phr boron nitride | 1.25 | 31.4 | 14.5 | 1.81 | 86(±10) |
| PHB + 1 phr NH$_4$Cl | 1.33 | 32.1 | 10.6 | 1.24 | 69(±4) |
| HB/HV + 1 phr boron nitride | 0.838 | 29.0 | 12.9 | 1.25 | 133(±15) |
| HB/HV + 1 phr NH$_4$Cl | 0.888 | 26.6 | 13.7 | 1.32 | 109(±8) |

EXPERIMENT 3

Further samples of PHB containing 1% ammonium chloride were prepared, in which the grade, and incorporation method, of the ammonium chloride were varied.

In a first sample, technical grade (98%) ammonium chloride was incorporated with PHB from solution, in the manner described in experiment 1.

In a second sample, crystals of technical grade ammonium chloride were incorporated with PHB.

In a third sample, crystals of high purity (99.99%) ammonium chloride were incorporated with PHB.

After performing a melt flow index test at 190° C. on the samples, DSC experiments were conducted, as previously described, on the 6 to 7 minute cut-offs. The results were as follows:

| | Peak $T_c$ (°C) | Area (J · g$^{-1}$) |
|---|---|---|
| PHB + 1% NH$_4$Cl (98% - Solution) | 96.0 | 70.1 |
| PHB + 1% NH$_4$Cl (98% - Crystals) | 75.2 | 61.4 |
| PHB + 1% NH$_4$Cl (99.99% - Crystals) | 70.1 | 52.2 |

Thus, the technical grade ammonium chloride incorporated as a solution was the more effective nucleating agent.

Further DSC analysis on the samples showed there to be a transition at around 170° C. in both of the samples in which the ammonium chloride had been incorporated as crystals, with the transition being most pronounced in the high purity ammonium chloride sample. There was no such transition in the DSC analysis of the sample in which the ammonium chloride had been incorporated as a solution.

Ammonium chloride undergoes a transition between a body centred cubic habit (lattice parameter 3.86 Å), and face centred cubic habit (lattice parameter 6.53 Å) at around 184° C. Thus, the DSC analysis of the samples indicates that the high purity crystals are in the bcc form, the technical grade incorporated as a solution is in the fcc form, and the technical grade crystals are a mixture with a major proportion exhibiting the bcc habit, and a minor proportion exhibiting the fcc habit.

EXPERIMENT 4

The method used in the Control Example of Experiment 1 was used on a sample of PHB in which the boron nitride was replaced with potassium bromide (lattice parameter of 6.59 Å). No nucleation of the PHB was observed.

EXPERIMENT 5

Two sets of samples were prepared according to the method of Experiment 2, and the biodegradability of each set was assessed.

In the first set of samples, 1 phr boron nitride was added as a nucleating agent.

In the second set of samples, 1 phr ammonium chloride was added as a nucleating agent.

The biodegradability of the two sets of samples was assessed by placement in enriched soil, at 30° C., for up to 79 days. During the 79 days groups of 3 replicates were removed from each set of samples. The wet weight of the groups was determined after removal of surface moisture. The groups were then dried for 16 hours at 50° C. after which the dry weight and average mechanical properties were determined. The results were as follows:

| Time (Days) | Av Weight Loss Wet (%) | | Av Weight Loss Dry (%) | | Av Youngs Modulus (GPa) | | Av Extens$^n$ at Break (%) | | Av Stress at Break (MPa) | | Av Force at Break (N) | |
|---|---|---|---|---|---|---|---|---|---|---|---|---|
|  | BN | AC | BN | AC | BN | AC | BN | AC | BN | AC | BN | AC |
| 0 | 0 | 0 | 0 | 0 | 1.15 | 1.71 | 8.5 | 6.5 | 34 | 37 | 365 | 390 |
| 23 | 4 | 8 | 5 | 9 | 1.21 | 1.28 | 7.8 | 7.6 | 31 | 31 | 325 | 300 |
| 41 | 11 | 20 | 12 | 22 | 1.22 | 1.60 | 5.5 | 5.8 | 33 | 28 | — | 243 |
| 55 | 13 | 27 | 14 | 29 | 1.34 | 1.66 | 6.2 | 5.8 | 28 | 34 | 282 | 227 |
| 79 | 17 | 39 | 18 | 40 | 1.45 | 1.38 | 5.0 | 3.6 | 26 | 20 | 254 | 154 |

It can thus be seen that the samples containing ammonium chloride (AC) degraded more than twice as fast as the samples containing boron nitride (BN).

We claim:

1. A hydroxyalkanoate polymer composition which comprises a hydroxyalkanoate polymer and ammonium chloride.

2. A composition as claimed in claim 1 in which the hydroxyalkanoate polymer comprises monomer units represented by the structure —$CHR^1(CH_2)_n.COO$— in which $R^1$ is hydrogen or an alkyl group, and n is a positive integer in the range 1 to 8.

3. A composition as claimed in claim 2 in which R is a methyl or ethyl group and n is an integer in the range 1 to 3.

4. A composition as claimed in claim 3 in which the hydroxyalkanoate polymer is a copolymer of hydroxybutyrate and other hydroxyalkanoate units.

5. A composition as claimed in claim 1 in which 0.5 to 10% of ammonium chloride is present based on the polymer.

6. A composition as claimed in claim 1 in which the polymer is a homopolymer of hydroxybutyric acid or a copolymer of hydroxybutyric acid and hydroxyvaleric acid which comprises at most 50 mol % of monomer units of 3-hyroxyvaleric acid.

7. A process of preparing a polymer composition as claimed in claim 1 which comprises intimately blending together a hydroxyalkanoate polymer and ammonium chloride.

8. A process of producing a formed hydroxyalkanoate polymer object which comprises heating, forming and cooling a composition comprising a hydroxyalkanoate polymer composition according to claim 1 wherein nucleation is promoted by the inclusion of ammonium chloride.

9. A process as claimed in claim 7 in which the polymer is mixed with a aqueous solution of ammonium chloride and the resultant composition is dried prior to further heat treatment.

* * * * *